(12) United States Patent
Appanna et al.

(10) Patent No.: US 7,609,617 B2
(45) Date of Patent: Oct. 27, 2009

(54) BGP HITLESS UPGRADE APPROACHES

(75) Inventors: Chandrashekhar Appanna, Cupertino, CA (US); Anantha Ramaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 11/108,053

(22) Filed: Apr. 14, 2005

(65) Prior Publication Data
US 2006/0233182 A1    Oct. 19, 2006

(51) Int. Cl.
*G01R 31/08*   (2006.01)
*G06F 11/00*   (2006.01)
*H04J 1/16*    (2006.01)
*H04J 3/14*    (2006.01)

(52) U.S. Cl. ..................................... 370/216
(58) Field of Classification Search ............... 370/216, 370/217, 218, 219, 220, 221, 225, 231, 350, 370/356, 395.31, 395.42, 503, 351
See application file for complete search history.

(56) References Cited

U.S. PATENT DOCUMENTS

| | | | |
|---|---|---|---|
| 6,910,148 B1 * | 6/2005 | Ho et al. ....................... | 714/4 |
| 2003/0007500 A1 | 1/2003 | Rombeaut et al. | |
| 2003/0140166 A1 * | 7/2003 | Harvey et al. ................ | 709/238 |
| 2004/0083128 A1 * | 4/2004 | Buckingham et al. ......... | 705/10 |
| 2004/0090913 A1 | 5/2004 | Scudder et al. | |
| 2004/0100969 A1 * | 5/2004 | Sankar et al. .......... | 370/395.31 |
| 2005/0078600 A1 | 4/2005 | Rusmisel et al. | |
| 2006/0002402 A1 * | 1/2006 | Nalawade et al. ........... | 370/401 |

OTHER PUBLICATIONS

Goldberg, Charles, "Making sure net routing doesn't fail," Network World, Nov. 18, 2002, 2 pages.
Cisco Systems, "Nonstop Forwarding with Stateful Switchover on the Cisco Catalyst 6500," Cisco White Paper, 2005, 16 pages.
Cisco Systems, "Border Gateway Protocol," Internetworking Technologies Handbook, Chapter 39, 10 pages, Sep. 11, 2003.

* cited by examiner

*Primary Examiner*—Chirag G Shah
*Assistant Examiner*—Ashley L Shivers
(74) *Attorney, Agent, or Firm*—Hickman Palermo Truong & Becker LLP (57) ABSTRACT

A method is disclosed for upgrading network protocol software, comprising receiving a new version of Border Gateway Protocol (BGP) software on a standby route processor that is coupled to an active route processor in a redundant arrangement; transferring, from the active route processor to the standby route processor, one or more transport protocol connections that are associated with one or more active BGP sessions of the active route processor; transferring, from the active route processor to the standby route processor, BGP session information representing the active BGP sessions; progressively shutting down an active BGP process of the active route processor; and switching control of BGP data processing to the standby route processor. The route processors may be placed in a stateful switchover mode of operation temporarily only during the transferring, shutting down, and switching. Thus a hitless BGP upgrade approach is provided.

29 Claims, 7 Drawing Sheets

BGP HITLESS UPGRADE APPROACHES

FIELD OF THE INVENTION

The present invention generally relates to upgrading software that is loaded in a running computer system. The invention relates more specifically to approaches for upgrading network protocol software in routers and switches without interfering with network routing and switching operations.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995). BGP sessions use Transmission Control Protocol (TCP), as defined in RFC 793, as a transport protocol.

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As defined in RFC1771, the structure of a BGP UPDATE message accommodates updates only to Internet Protocol version 4 (IPv4) unicast routes. The Multiprotocol Extension for BGP defined in RFC2858 (published by IETF in June 2000) accommodates updates to routing information for multiple Network Layer protocols, such as, for example, Internet Protocol version 6 (IPv6), Internetwork Packet eXchange (IPX), Appletalk, Banyan Vines, Asynchronous Transfer Mode (ATM), X.25, and Frame Relay. RFC2858 introduced two single-value parameters to accommodate the changes to the BGP UPDATE message structure: the Address Family Identifier (AFI) and the Subsequent Address Family Identifier (SAFI).

The AFI parameter carries the identity of the network layer protocol associated with the network address that follows next in the path to the destination. The SAFI parameter provides additional information about the type of the Network Layer Reachability Information that is included in a BGP UPDATE message, and the values defined for this parameter usually indicate a type of communication forwarding mechanism, such as, for example, unicast or multicast. While some of the AFI and SAFI values are reserved for private use, the AFI and SAFI values that can be commonly used by the public must be assigned through the Internet Assigned Numbers Authority (IANA). The AFI/SAFI combination is used by the software implementations of BGP to indicate the type of the BGP prefix updates, what format the prefix updates have, and how to interpret the routes included in the BGP UPDATE messages.

As networks grow more complex and the number of BGP routes maintained by a particular element increases, the consequences of the failure of a BGP host device, or the BGP process that it hosts, become more severe. For example, in some scenarios a BGP failure may require retransmission of a large amount of route information and re-computation of a large amount of network reachability information. Therefore, vendors of network gear and their customers wish to deploy BGP in a fault-tolerant manner.

One term sometimes applied to fault-tolerant information transfer techniques is "stateful switchover" or SSO. SSO is typically implemented with network elements that have dual route processors, each of which can host separate but duplicate instances of various software applications. One route processor is deemed Active and the other is deemed Standby. When the processors are operating in SSO mode, the active route processor automatically replicates all messages that it receives or sends, for all protocols or activities, and sends the replicated messages to the standby route processor. In some embodiments, the active route processor periodically sends a bulk copy of data representing a particular state (a "checkpoint") to the standby route processor. While replication and checkpointing enable the standby route processor to achieve synchronization of state with the active route processor, these approaches require considerable use of processing resources and memory, and require extensive use of an inter-processor communication mechanism. When a route processor is managing a large number of BGP sessions and TCP connections, the burden of continually operating in SSO mode may become unacceptable.

As networks grow larger and more complex, network reliability and throughput depends to a greater extent upon the availability of software processes that implement BGP. For example, when a BGP host becomes unavailable, many other BGP peers may need to re-compute route information to account for the unavailability.

In typical network management approaches, upgrading the software that runs on a BGP host is highly disruptive and will induce BGP peers to re-compute route information, using valuable processing and memory resources. One typical upgrade approach uses the following steps:

1. Reset all BGP sessions and terminate the current BGP speaker process, by reloading that process or issuing a process-kill command.
2. Load a new version of the BGP software.
3. Restart the BGP software.
4. Re-establish sessions with all BGP peers.
5. Run best path computations, after receiving routes from all peers.
6. Re-advertise updates to all peers.

When these steps are performed a BGP Route Reflector node, or a provider edge (PE) router that is hosting a large number of BGP sessions with customer edge (CE) routers, the upgrade process impacts hundreds to thousands of other routers, because they all lose BGP connectivity during the transition. Thus, present approaches for upgrading BGP software to support new features in large networks cause significant network churn. Network administrators are demanding a better solution that does not perturb the network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for upgrading network protocol software is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Example Implementation of Method for Upgrading Network Protocol Software
4.0 Implementation Mechanisms-Hardware Overview
5.0 Extensions and Alternatives 1.0 GENERAL OVERVIEW The needs identified in the foregoing Background, and other needs and objects that will become apparent for the following description, are achieved in the present invention, which comprises, in one aspect, a method for upgrading network protocol software, comprising receiving a new version of Border Gateway Protocol (BGP) software on a standby route processor that is coupled to an active route processor in a redundant arrangement; transferring, from the active route processor to the standby route processor, one or more transport protocol connections that are associated with one or more active BGP sessions of the active route processor; transferring, from the active route processor to the standby route processor, BGP session information representing the active BGP sessions; progressively shutting down an active BGP process of the active route processor; and switching control of BGP data processing to the standby route processor.

Stateless switchover (SSO) capabilities of the route processor system may be requested on demand at the time that a BGP upgrade is performed. Thus, the approaches herein invoke SSO only when needed to accomplish switchover of BGP sessions and TCP connections. A node implementing the approaches that are described herein is not required to operate in SSO mode at all times. As a result, the approaches herein greatly reduce processing burdens on the node.

According to one feature, the active BGP process initiates a route refresh to provide the standby route processor with routing data.

According to another feature, the active BGP process ceases generating updates and later ceases sending KEEPALIVE messages as part of progressively shutting down.

According to yet another feature, the active BGP process instructs an active transport control protocol (TCP) process, hosted at the active route processor, to cease accepting packets on one or more active TCP connections, and later processes all packets previously received by the active TCP process.

According to still another feature, the standby BGP process determines best paths and re-advertises routes to all peers.

According to a further feature, the active BGP process determines one or more transport layer connections associated with BGP sessions that are important based on fees paid.

According to another feature, the active BGP process determines one or more transport layer connections associated with BGP sessions that are important; instructs an active transport layer protocol process to stop accepting further data for the important connections; deletes out-of-order packet queues for the important connections; and wherein the standby BGP process replicates send queues for the important connections, and accepts the important connections.

According to yet another feature, the active route processor and the standby route processor comprise a redundant router system for a packet-switched network.

According to still another feature, the transport layer protocol processes are TCP processes.

In other aspects, the invention encompasses a computer apparatus and a computer-readable medium configured to carry out the foregoing steps.

2.0 STRUCTURAL AND FUNCTIONAL OVERVIEW

Figure 1:
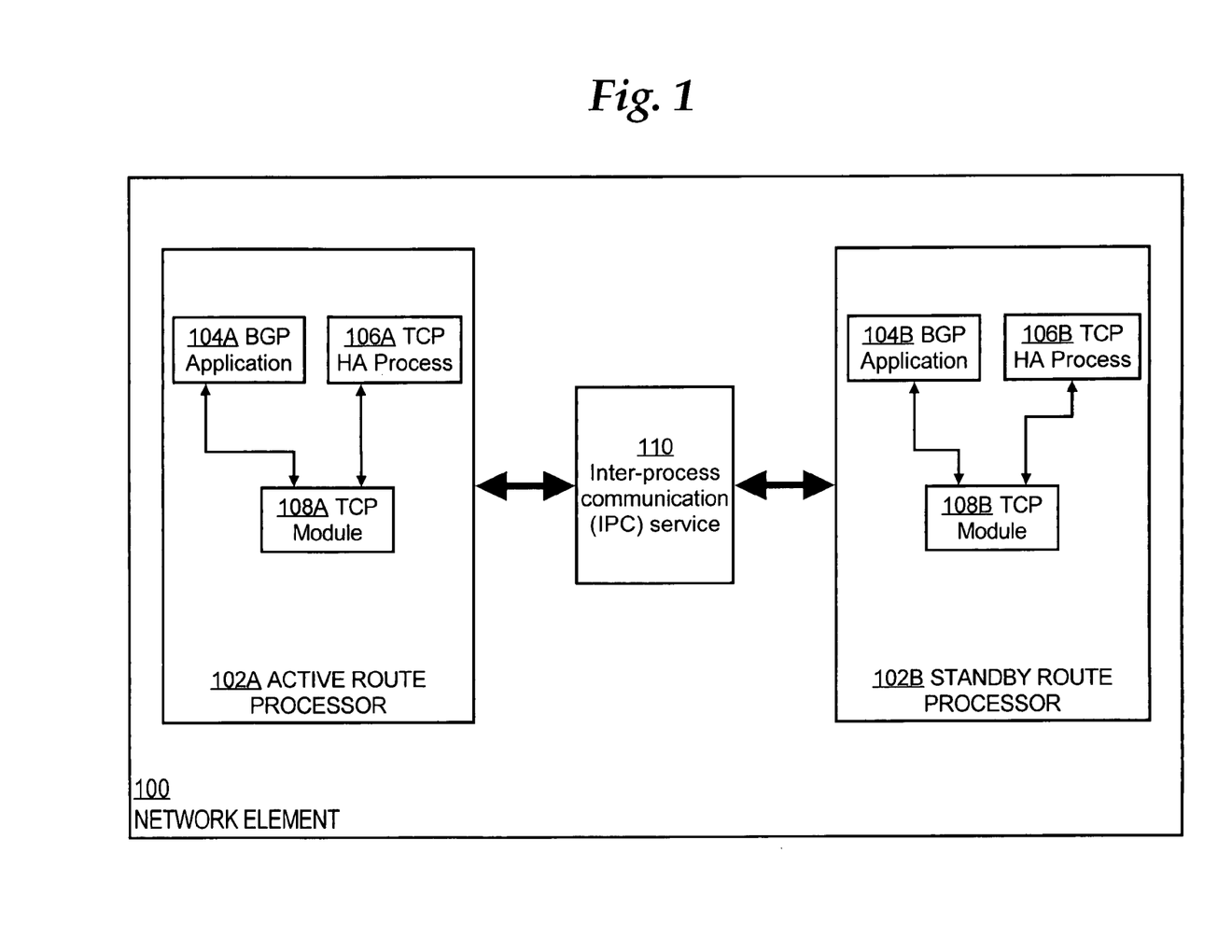
FIG. 1 is a block diagram that illustrates an overview of a network element that may be used to implement an embodiment.

FIG. 1 is a block diagram that illustrates an overview of a network element that may be used to implement an embodiment. A network element 100 comprises an active route processor 102A and a standby route processor 102B arranged in a redundant or fault-tolerant configuration. In one embodiment, network element 100 is a dual-processor router or switch that participates in a packet-switched network or internetwork. Active route processor 102A hosts a TCP module 108A that runs or controls a TCP high-availability (HA) process 106A and a BGP application 104A. Standby route processor 102B hosts a TCP module 108B, BGP application 104B, and TCP HA process 106B.

TCP modules 108A, 108B and TCP HA processes 106A, 106B provide transport control protocol functionality. BGP application 104A, 104B provide border gateway protocol functionality. In alternative embodiments, active route processor 102A and standby route processor 102B may host other protocols and applications. Thus, TCP modules 108A, 108B, TCP HA processes 106A, 106B, and BGP application 104A, 104B are shown only as examples and not as requirements.

An inter-process communication (IPC) service 110 is coupled between active route processor 102A and standby route processor 102B, and provides a means for the route processors to exchange data and instructions.

In one embodiment, network element 100 is implemented as one of the Cisco 10000 Series Routers, or CRS-1 Carrier Routing System, both commercially available from Cisco Systems, Inc.

The arrangement of FIG. 1 represents just one possible context for applying the approaches described herein. The approaches herein are generally applicable to any other context in which BGP software needs to be upgraded without interrupting BGP data processing operations.

Figure 2:
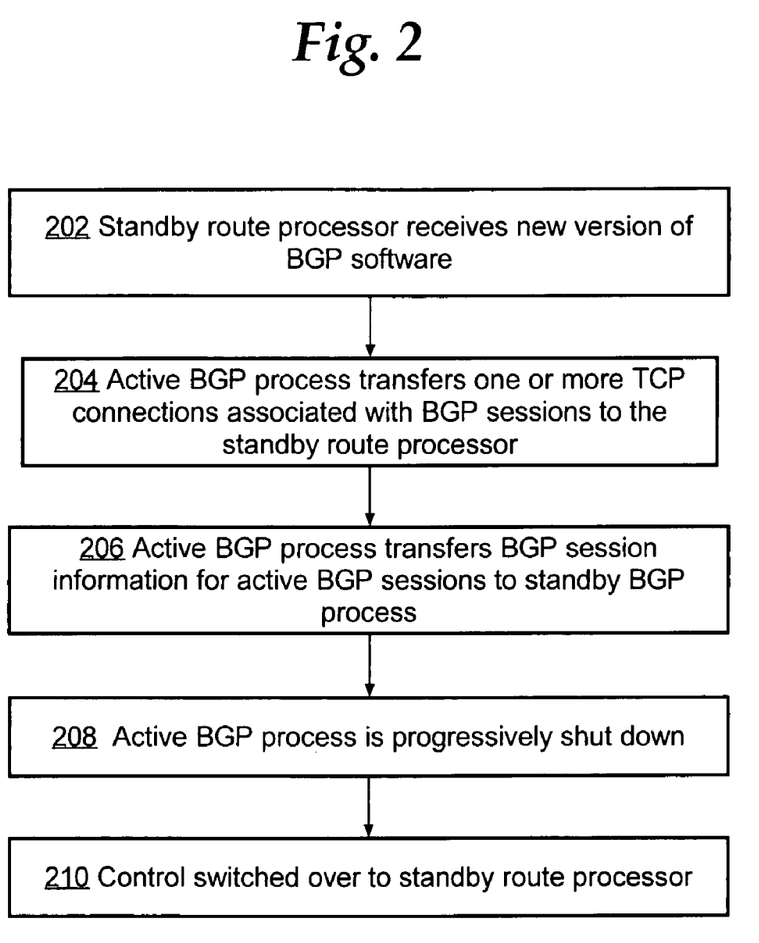
FIG. 2 is a flow diagram that illustrates a high level overview of one embodiment of a method for upgrading network protocol software.

FIG. 2 is a flow diagram that illustrates a high level overview of one embodiment of a method for upgrading network protocol software.

At step 202, a new version of Border Gateway Protocol (BGP) software is received on a standby route processor that is coupled to an active route processor in a redundant arrangement. Step 202 may occur in response to a network administrator loading a software upgrade or new version of BGP software on a standby route processor of a redundant router system.

In step 204, the active route processor transfers to the standby route processor one or more transport protocol connections that are associated with one or more active BGP sessions of the active route processor.

In step 206, the active route processor transfers to the standby route processor BGP session information representing the active BGP sessions.

In step 208, an active BGP process hosted by the active route processor is progressively shut down. Specific techniques for progressive shutdown, which may be used to gracefully accomplish a transfer of control and responsibility to the standby route processor, are described further below.

In step 210, control of BGP data processing is switched over to the standby route processor.

3.0 EXAMPLE IMPLEMENTATION OF METHOD FOR UPGRADING NETWORK PROTOCOL SOFTWARE

3.1 Switchover Of BGP Sessions And TCP Connections

Figure 3A:
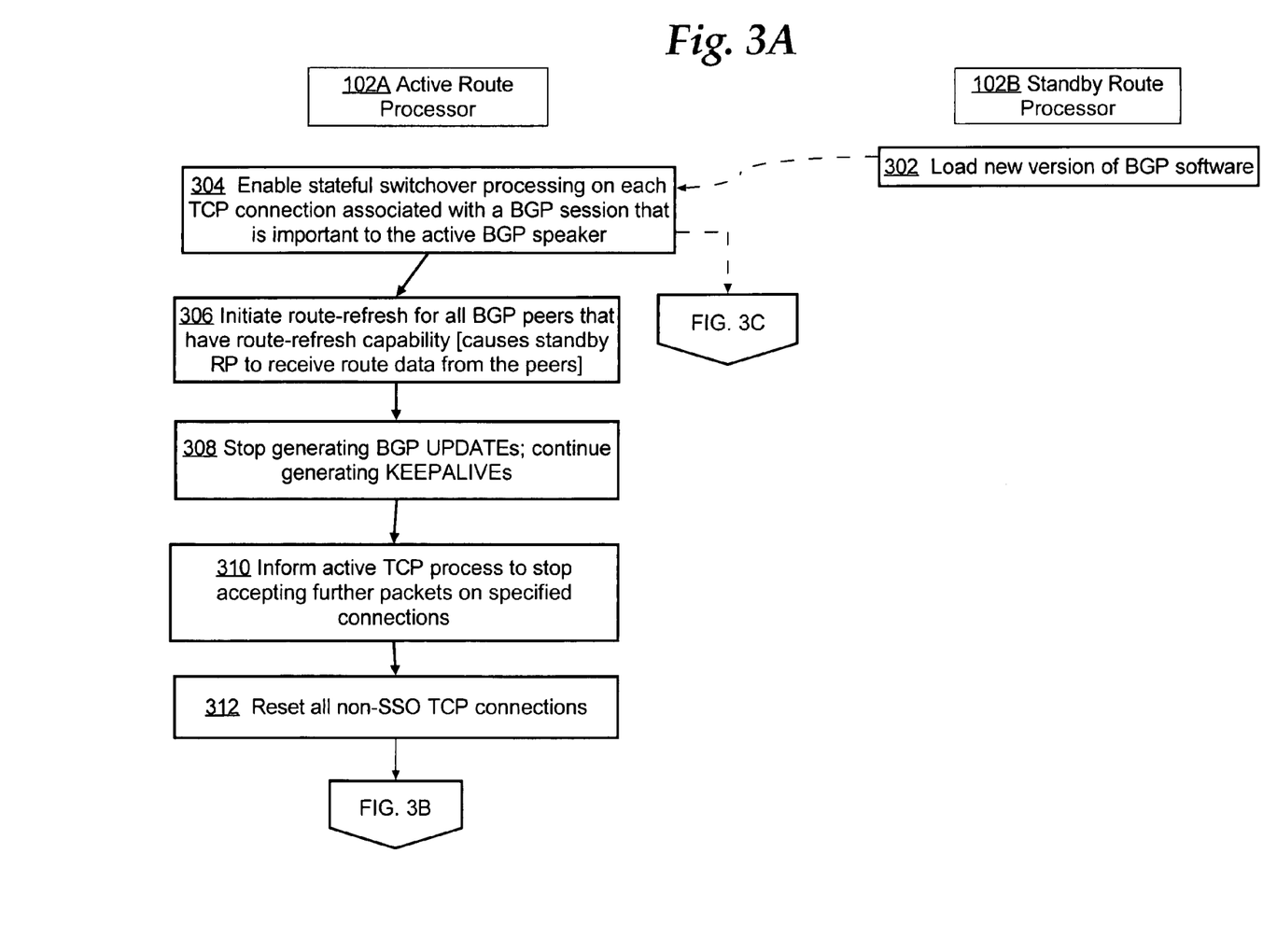
FIG. 3A, FIG. 3B and FIG. 3C are flow diagrams that illustrate details of one embodiment of a method for upgrading network protocol software.
Figure 3B:
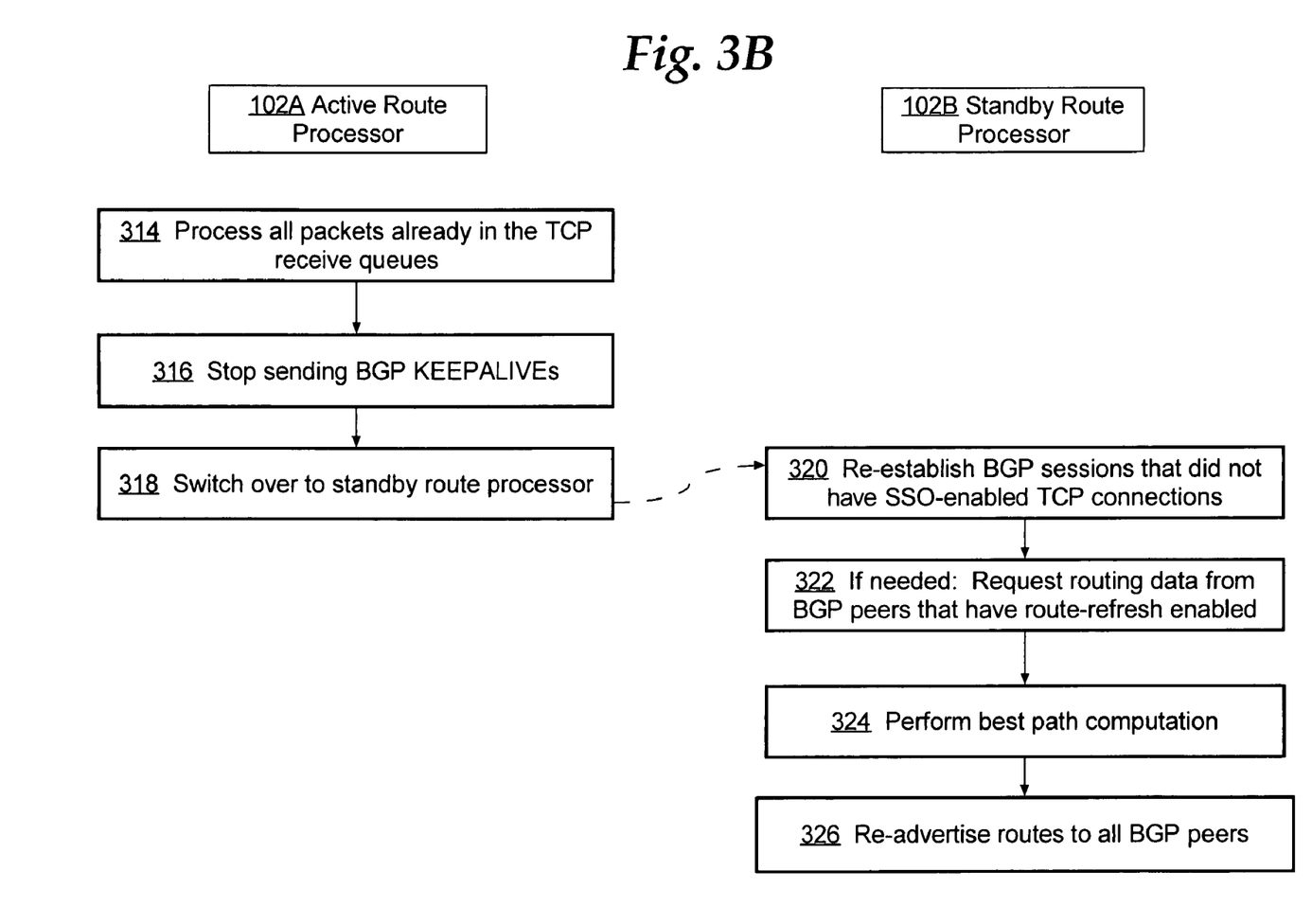
Figure 3C:
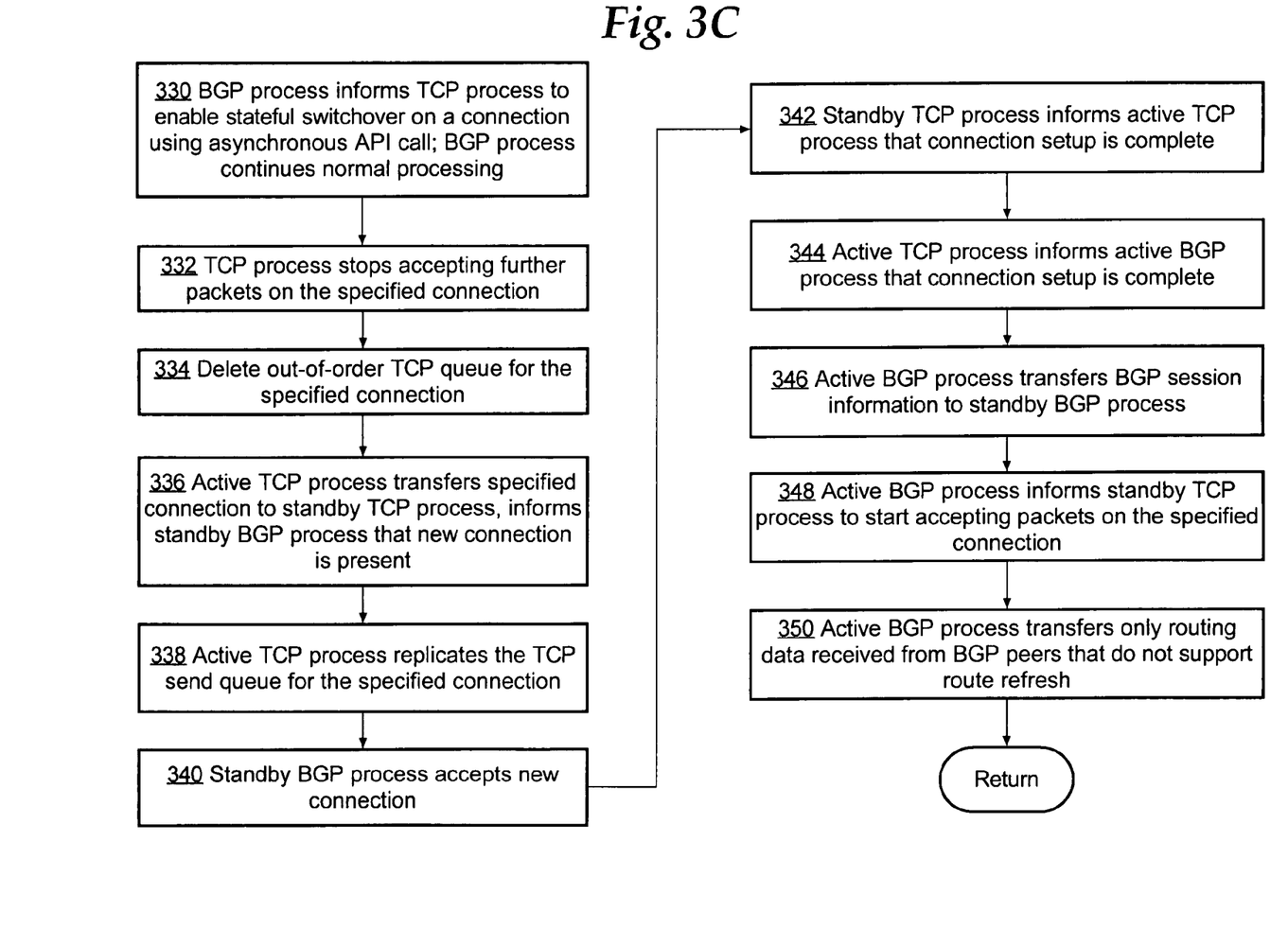

FIG. 3A, FIG. 3B and FIG. 3C are flow diagrams that illustrate details of one embodiment of a method for upgrading network protocol software. The steps shown in FIG. 3A, FIG. 3B, and FIG. 3C are not illustrated in any particular required order. Certain steps may be re-ordered for the purpose of improving performance in particular network arrangements.

Referring first to FIG. 3A, at step 302, a new version of BGP software is loaded on the standby route processor. In the context of FIG. 1, a new version or an upgrade of BGP application 104B is loaded on standby route processor 102B. At step 304, stateful switchover (SSO) processing is enabled for each TCP connection that is associated with a BGP session that is important to the active BGP speaker.

Either step 302 or step 304 may include placing the routing system into an SSO system mode. For example, certain embodiments use a stateful switchover service of an operating system that runs on the active route processor and standby route processor. In the description of these embodiments herein, the presence of an SSO service is assumed. Aspects of an SSO service are described in Banks et al., "Dynamic Configuration Synchronization in Support of a "Hot" Standby for Stateful Switchover," U.S. application Ser. No. 10/156,563, filed May 24, 2002; Banks et al., "Method and apparatus for providing interoperation of computer processes of different versions," U.S. application Ser. No. 10/638,149, filed Aug. 7, 2003; and Appanna et al., "Routing system and method for transparently recovering routing states after a failover or during a software upgrade," U.S. application Ser. No. 10/808,040, filed Mar. 24, 2004. An SSO service is commercially available from Cisco Systems, Inc., San Jose, Calif., as part of Cisco IOS® Software for the 6500 Series Router, for example.

Step 304 implies that SSO processing may be enabled, and the switchover approach described herein may be performed, for some BGP sessions and associated TCP connections that are deemed "important," but not others. A network administrator may use a configuration function to specify sessions and connections that are important. A service provider implementing the approaches herein may require a fee payment from its customers as a condition of designating sessions and associated connections important. An approach for generating revenue in this manner is separately described herein with reference to FIG. 5.

In one embodiment, step 304 involves the other specific steps shown in FIG. 3C, which is described further below.

The active route processor 102A then begins a series of steps that gradually shut down the active BGP process. At step 306, a route-refresh request is initiated for all BGP peer nodes that are capable of handling a route-refresh request. As a result, the standby route processor automatically receives routing data from all such peers. The automatic transfer of such routing data occurs because the associated BGP sessions are in SSO mode, and when in SSO mode the active route processor 102A automatically replicates received route update messages and forwards the replicated messages to the standby route processor 102B using IPC service 110. As part of step 306, the active route processor waits for a period of time, which may be determined by the size of the routing table and the number of peers, to allow the peers to send out all data.

As an alternative to a waiting approach, the active route processor may watch the routing update messages that the peers send, looking for a BGP "End of RIB" (EOR) indication, which indicates that updates are complete. In response to detecting an EOR value, the active route processor can proceed.

At step 308, the active BGP process stops generating BGP UPDATE messages, but continues generating KEEPALIVE messages as required.

At step 310, the active BGP process informs the active TCP process to stop accepting further packets on all TCP connections that are enabled for the SSO process herein. In this context, "further packets" refers to all packets beyond the last acknowledged point in the TCP receive window for each connection. This approach ensures that no TCP packets are in process during subsequent steps, and therefore the TCP receive window will not indicate missing packets or contain sequence number gaps after a switchover At step 312, the active route processor resets all TCP connections that do not have SSO enabled. For these connections, using conventional reset mechanisms is performed.

Referring now to FIG. 3B, at step 314, the active route processor processes all packets that are already in the TCP receive queues. Step 314 allows the active route processor to complete processing packets that have been received so that packet loss will not occur and so that the sending TCP peer is not required to re-transmit. Step 314 may include postponing a hold timer expiration value for the SSO enabled connections during this interval, so that those connections do not close. Alternatively, every time the hold timer is about to expire, the active route processor may accept one packet from the corresponding peer. In this way, the active route processor throttles the existing TCP connections so that minimal processing is performed while shutdown steps are occurring.

At step 316, the active BGP process stops sending KEEPALIVE messages. At step 318, the active route processor switches control to the standby route processor. In one embodiment, switchover processes provided by the SSO service are used to transfer control. The particular mechanism used for switchover to the standby route processor is not critical, provided that all packet flows after the instant of switchover are sent to the standby route processor rather than to the active route processor.

At step 320, the standby route processor 102B reestablishes the BGP sessions that did not have SSO support enabled for the underlying TCP connection. Re-establishing a BGP session may use the session establishment techniques defined in IETF RFCs for BGP. At step 322, if necessary, routing data is requested from BGP peers that have the route-refresh capability.

At step 324, a conventional best path computation is performed after route data is received from all peers. At step 326, the standby route processor re-advertises its routes to all BGP peers. At this point, switchover of all BGP sessions and associated TCP connections is complete. The sessions and connections run with the new or upgraded BGP software hosted at the standby route processor 102B, with minimal disruption of the sessions and connections. After step 326, new BGP software can be installed for the active route processor, or an upgrade can be performed.

3.2 Enabling Stateful Switchover TCP Connections

Referring now to FIG. 3C, steps relating to enabling SSO on TCP connections are described. The steps of FIG. 3C are performed for each TCP connection for which SSO is to be enabled. Thus, FIG. 3C may be regarded as interior steps of a logical processing loop initiated at step FIG. 3A, step 304 for each connection. In the description following, the term "specified connection" refers to one TCP connection that is the subject of processing steps during an iteration of the loop. Alternatively, each step of FIG. 3C may be repeated for all connections.

At step 330, the active BGP process informs the active TCP process to enable SSO on a specified connection. For example, an asynchronous API call to the TCP process may be used. The active BGP process continues normal processing after making the API call.

At step 332, the active TCP process stops accepting further packets on the connection. As with step 310, step 332 ensures that no packets are in process during subsequent steps so no holes in the TCP receive window will occur, and "further packets" also refers to packets beyond the last acknowledged point in the TCP in the receive window of TCP for each connection.

As an alternative, at both step 310 and step 332, the TCP process may shrink the TCP receive window by suddenly advertising a window size of zero. However, this approach does not comply with the RFCs that define TCP. Allowing the TCP peer to retransmit non-processed packets is another alternative that is not considered harmful, is RFC compliant.

At step 334, the out-of-order TCP queues are deleted for all SSO enabled connections. The out-of-order queues can be deleted because they are not needed for purposes of preserving a connection. Loss of the queues simply means that the retransmission timers of the peer TCP process eventually will expire, causing the peer TCP node to re-transmit missing packets. Thus, step 334 ultimately transfers the burden of dealing with packets received out of order to the peer node.

At step 336, the active TCP process transfers the specified connection and informs the standby BGP process that a new connection is present. Step 336 assumes that a separate mechanism is available for transferring a TCP connection from one route processor to another. The specific steps involved in that mechanism are beyond the scope of this description. However, TCP connection transfer mechanisms exist in the pertinent art, and any such mechanism may be used.

At step 338, the active TCP process replicates the TCP send-queue for the specified connection, or for all SSO enabled TCP connections. Replication in step 338 provides a copy of the TCP send queue to the standby TCP process. Alternatively, the active TCP process can generate dummy packets to achieve the same result.

At step 340, the standby BGP process accepts the new TCP connection. In an implementation that uses Cisco IOS XR Software, the In-Service Software Upgrade (ISSU) function ensures that the active BGP speaker and standby BGP speaker have the same base functional capabilities. Cisco IOS XR Software is commercially available from Cisco Systems, Inc. and is normally used with the CRS-1 platform.

At step 342, the standby TCP process informs the active TCP process that the connection setup process is complete. In turn, at step 344, the active TCP process informs the active BGP process that connection setup is complete.

At step 346, the active BGP process transfers all required BGP data to the standby BGP process, which can be done at step 346 because the corresponding TCP connection is available on the standby route processor. At step 348, the active BGP process informs that standby TCP process to start accepting packets on the connection.

At step 350, the active BGP process transfers only routing data that has been received from BGP peers that do not support a route refresh operation. There is no need to transfer received routing data from BGP speakers that support route refresh. Step 350 completes the process of transferring active BGP sessions to the standby route processor that is running new software or upgraded software.

3.3 Generating Revenue For Switchover Services

Figure 5:
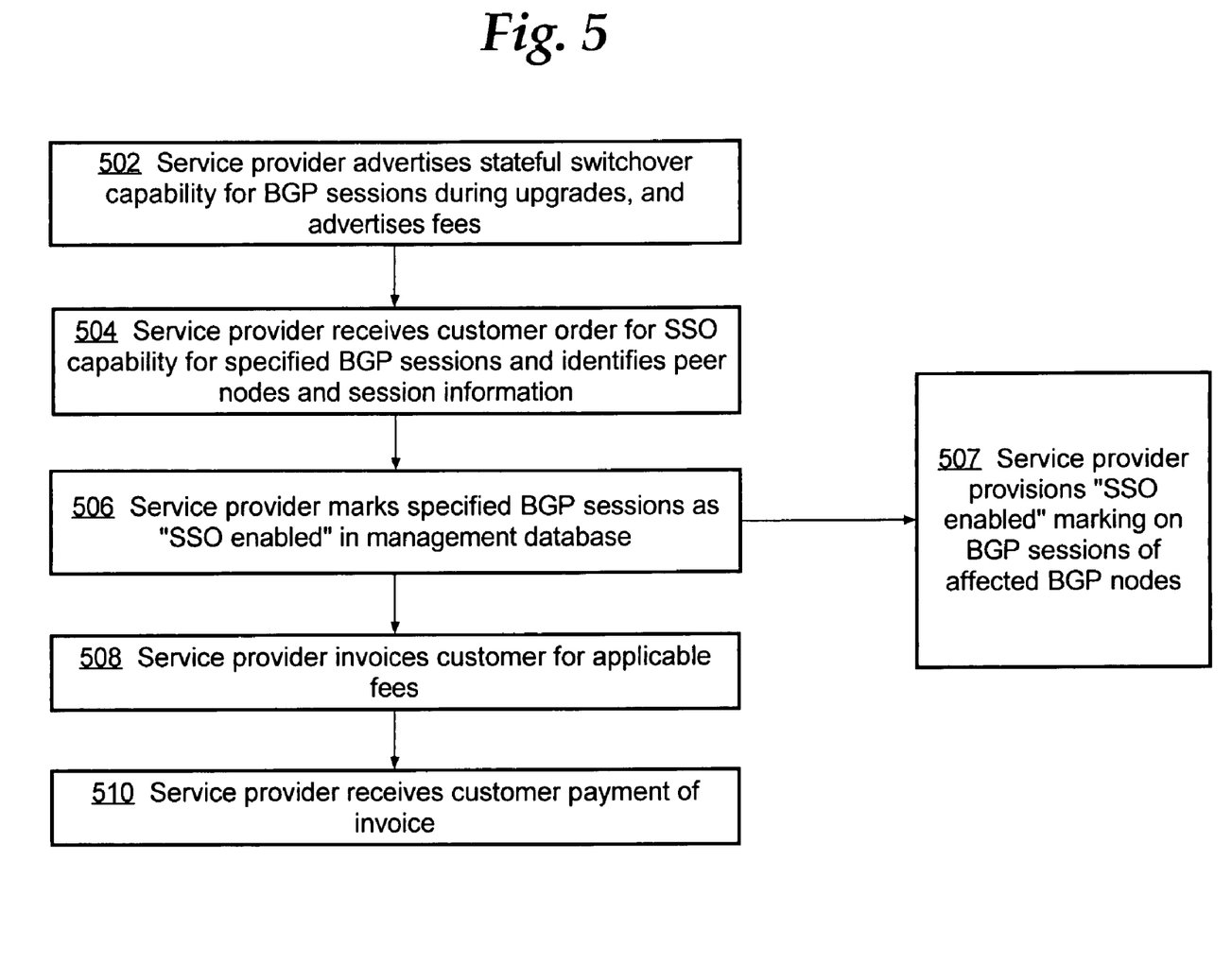
FIG. 5 is a flow diagram showing a method of generating revenue for switchover services that a service provider provides.

FIG. 5 is a flow diagram showing a method of generating revenue for switchover services that a service provider provides. The approach of FIG. 5 is suitable for use in network deployments where, for example, network element 100 of FIG. 1 is a provider edge (PE) router of a service provider (SP) network that interacts with one or more customer edge (CE) routers associated with one or more customers of the SP network. Generally, the approach of FIG. 5 enables the SP to receive requests to designate BGP sessions between the PE routers and CE routers as SSO enabled, on a per-customer basis, to provision network elements with such sessions as SSO enabled, and to collect revenue in consideration for applying SSO processing to such sessions.

At step 502, a service provider advertises stateful switchover capability for BGP sessions during upgrades, and advertises associated fees. An advertisement of step 502 may be communicated to a customer in any appropriate format or medium, and may involve, for example, marketing communications activities of the service provider, promotions in Web sites, emails to customers, etc. An advertisement may indicate that SSO processing is available for designated BGP sessions and a fee charged by the service provider for performing SSO processing of the BGP sessions during software upgrades, additions or other device operations. The capability and the fee may be advertised separately.

At step 504, the service provider receives an order for SSO capability for one or more specified BGP sessions that identifies peer nodes and session information. The particular information received in step 504 is not critical provided that the service provider can adequately identify which BGP sessions the customer wishes to protect using SSO capability for software upgrades. Appropriate information may include names, IP addresses or other identifying information for the BGP peers that are involved, BGP port values, etc.

At step 506, the service provider marks the specified BGP sessions as "SSO enabled" in a management database. Any form of database may be used that enables the service provider to retain a persistent record of what was ordered. At step 507, the service provider provisions the SSO-enabled marking to the specified BGP sessions on all affected BGP nodes. Step 507 may involve communicating provisioning messages from a network management station that holds the database of step 506 to BGP routers that are involved in the specified BGP sessions.

At step 508, the service provider invoices the customer for applicable fees. Invoicing may involve any suitable form of communicating the agreed service and fee to the customer. Examples include email invoicing, postal mail invoicing, adding specified charges to an existing invoice or account, creating and storing an account record in an accounting database, etc.

At step 510, the service provider receives customer payment for the invoice. Payment may involve issuing a check, making an electronic funds transfer, initiating a credit card charge, or other means.

3.4 Benefits Of Certain Embodiments

Embodiments of the approaches herein provide improvements over past practice. For example, certain embodiments provide a solution for achieving "hitless upgrade" of BGP software by on-demand invocation of SSO support. The approaches herein minimize the need for resource-intensive procedures such as data checkpointing and state synchronization among the active and standby processes. Further, the approaches do not negatively impact network performance and can be used at any planned time. Thus, the approaches allow for hitless and planned upgrades without affecting regular BGP convergence.

The approaches herein are believed to be about 3-4 times faster than a switchover that involves a reset of peer connections. Further, the approach herein only requires BGP to operate in SSO mode when an upgrade is planned, and therefore does not require BGP to operate in SSO mode at all times. Since the BGP sessions and TCP connections do not go down, the upgrade does not affect peer nodes.

4.0 IMPLEMENTATION MECHANISMS

Hardware Overview

Figure 4:
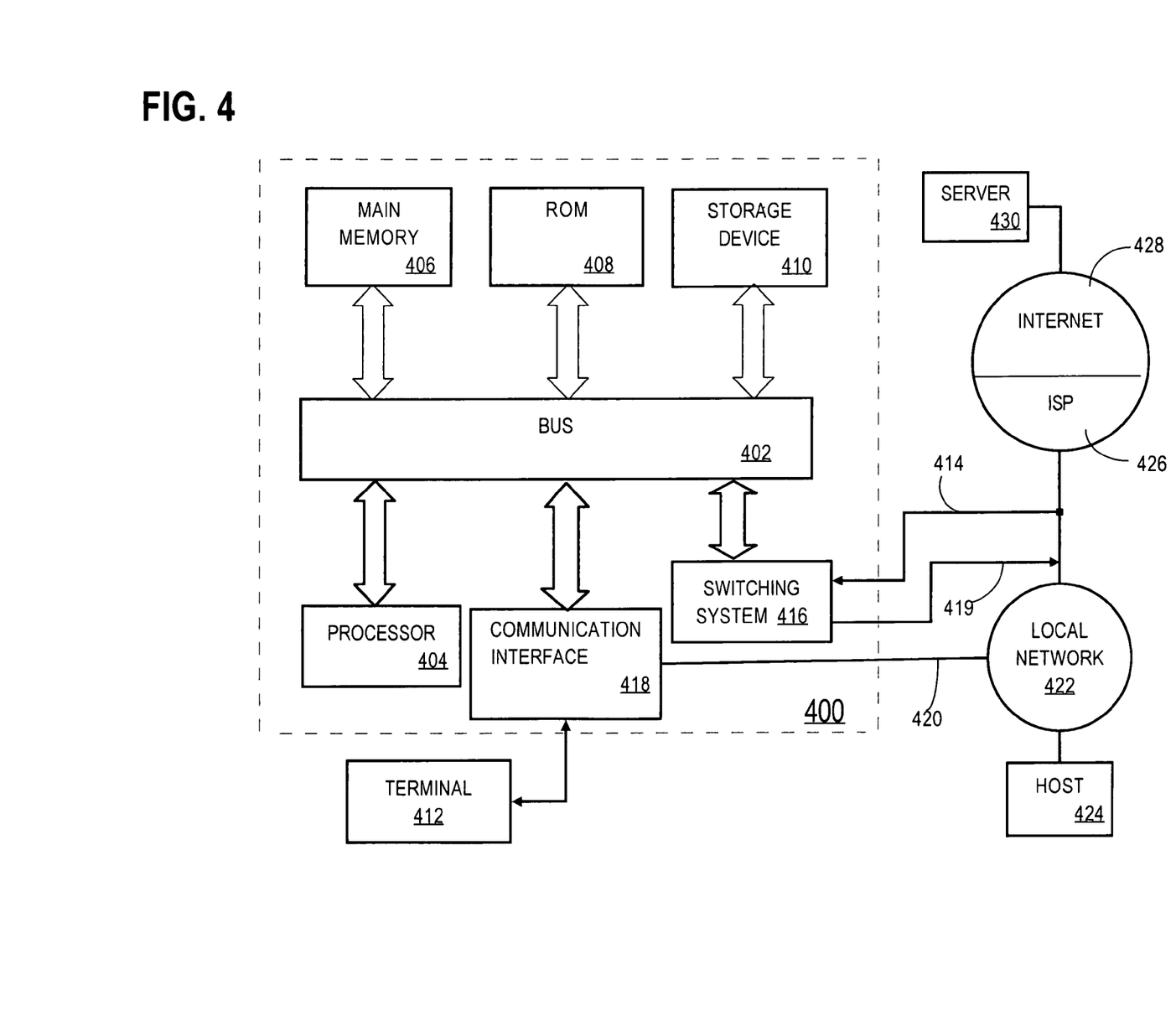
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for upgrading network protocol software. According to one embodiment of the invention, upgrading network protocol software is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for upgrading network protocol software as described herein.

Processor 404 may execute the received code as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
    receiving a new version of Border Gateway Protocol (BGP) software on a standby route processor that is coupled to an active route processor in a redundant arrangement;
    in response to determining, by an active BGP process of the active route processor, one or more transport layer important connections, associated with BGP sessions of the active route processor, transferring, from the active route processor to the standby route processor, one or more transport protocol connections that are associated with one or more active BGP sessions of the active route processor, starting from the one or more transport layer important connections, and instructing an active transport layer protocol process of the active route processor to stop accepting further data on the transferred transport protocol connections;
    transferring, from the active route processor to the standby route processor, BGP session information representing the active BGP sessions;
    progressively shutting down an active BGP process of the active route processor; and
    switching control of BGP data processing to the standby route processor.

2. A method as recited in claim 1, wherein the active BGP process initiates a route refresh to provide the standby route processor with routing data.

3. A method as recited in claim 1, wherein the active BGP process ceases generating updates and later ceases sending KEEPALIVE messages as part of progressively shutting down.

4. A method as recited in claim 1, wherein the active BGP process instructs an active TCP process, hosted at the active route processor, to cease accepting packets on one or more active TCP connections, and later processes all packets previously received by the active TCP process.

5. A method as recited in claim 1, wherein the standby BGP process determines best paths and re-advertises routes to all peers.

6. A method as recited in claim 1, wherein the active BGP process determines one or more transport layer connections associated with BGP sessions that are important based on fees paid.

7. A method as recited in claim 1, wherein the active BGP process further deletes out-of-order packet queues for the important connections; and wherein the standby BGP process replicates send queues for the important connections, and accepts the important connections.

8. A method as recited in claim 1, wherein the active route processor and the standby route processor comprise a redundant router system for a packet-switched network.

9. A method as recited in claim 1, wherein the transport layer protocol processes are TCP processes.

10. A network routing apparatus, comprising:
an active route processor;
a standby route processor that is coupled to the active route processor in a redundant arrangement;
a volatile or non-volatile computer-readable medium that is accessible to the active route processor and the standby route processor, and comprising one or more sequences of instructions which, when executed by the route processors, cause the route processors to perform the steps of:
receiving a new version of Border Gateway Protocol (BGP) software on a standby route processor that is coupled to an active route processor in a redundant arrangement;
in response to determining, by an active BGP process of the active route processor, one or more transport layer important connections, associated with BGP sessions of the active route processor, transferring, from the active route processor to the standby route processor, one or more transport protocol connections that are associated with one or more active BGP sessions of the active route processor, starting from the one or more transport layer important connections, and instructing an active transport layer protocol process of the active route processor to stop accepting further data on the transferred transport protocol connections;
transferring, from the active route processor to the standby route processor, BGP session information representing the active BGP sessions;
progressively shutting down an active BGP process of the active route processor; and
switching control of BGP data processing to the standby route processor.

11. An apparatus as recited in claim 10, wherein the active BGP process initiates a route refresh to provide the standby route processor with routing data.

12. An apparatus as recited in claim 10, wherein the active BGP process ceases generating updates and later ceases sending KEEPALIVE messages as part of progressively shutting down.

13. An apparatus as recited in claim 10, wherein the active BGP process instructs an active TCP process, hosted at the active route processor, to cease accepting packets on one or more active TCP connections, and later processes all packets previously received by the active TCP process.

14. An apparatus as recited in claim 10, wherein the standby BGP process determines best paths and re-advertises routes to all peers.

15. An apparatus as recited in claim 10, wherein the active BGP process determines one or more transport layer connections associated with BGP sessions that are important based on fees paid.

16. An apparatus as recited in claim 10, wherein the active BGP process; further deletes out-of-order packet queues for the important connections; and wherein the standby BGP process replicates send queues for the important connections, and accepts the important connections.

17. An apparatus as recited in claim 10, wherein the active route processor and the standby route processor comprise a redundant router system for a packet-switched network.

18. An apparatus as recited in claim 10, wherein the transport layer protocol processes are TCP processes.

19. A network routing apparatus, comprising:
an active route processor;
a standby route processor that is coupled to the active route processor in a redundant arrangement;
means for receiving a new version of Border Gateway Protocol (BGP) software on a standby route processor that is coupled to an active route processor in a redundant arrangement;
means for transferring, from the active route processor to the standby route processor, in response to determining, by an active BGP process of the active route processor one or more transport layer important connections associated with BGP sessions of the active route processor, one or more transport protocol connections that are associated with one or more active BGP sessions of the active route processor, starting from the one or more transport layer important connections, and instructing an active transport layer protocol process of the active route processor to stop accepting further data on the transferred transport protocol connections;
means for transferring, from the active route processor to the standby route processor, BGP session information representing the active BGP sessions;
means for progressively shutting down an active BGP process of the active route processor; and
means for switching control of BGP data processing to the standby route processor.

20. An apparatus as recited in claim 19, wherein the active BGP process initiates a route refresh to provide the standby route processor with routing data.

21. An apparatus as recited in claim 19, wherein the active BGP process ceases generating updates and later ceases sending KEEPALIVE messages as part of progressively shutting down.

22. An apparatus as recited in claim 19, wherein the active BGP process instructs an active TCP process, hosted at the active route processor, to cease accepting packets on one or more active TCP connections, and later processes all packets previously received by the active TCP process.

23. An apparatus as recited in claim 19, wherein the standby BGP process determines best paths and re-advertises routes to all peers.

24. An apparatus as recited in claim 19, wherein the active BGP process determines one or more transport layer connections associated with BGP sessions that are important based on fees paid.

25. An apparatus as recited in claim 19, wherein the active BGP process further deletes out-of-order packet queues for the important connections; and wherein the standby BGP process replicates send queues for the important connections, and accepts the important connections.

26. An apparatus as recited in claim 19, wherein the active route processor and the standby route processor comprise a redundant router system for a packet-switched network.

27. An apparatus as recited in claim 19, wherein the transport layer protocol processes are TCP processes.

28. A volatile or non-volatile computer-readable medium carrying one or more sequences of instructions for upgrading network protocol software, which instructions, when executed by one or more processors, cause the one or more processors to carry out the steps of:
receiving a new version of Border Gateway Protocol (BGP) software on a standby route processor that is coupled to an active route processor in a redundant arrangement;
in response to determining, by an active BGP process of the active route processor, one or more transport layer important connections, associated with BGP sessions of the active route processor, transferring, from the active route processor to the standby route processor, one or more transport protocol connections that are associated with one or more active BGP sessions of the active route processor, starting from the one or more transport layer important connections, and instructing an active transport layer protocol process of the active route processor to stop accepting further data on the transferred transport protocol connections;

transferring, from the active route processor to the standby route processor, BGP session information representing the active BGP sessions;

progressively shutting down an active BGP process of the active route processor; and switching control of BGP data processing to the standby route processor.

29. A method, comprising:

receiving a new version of Border Gateway Protocol (BGP) software on a standby route processor that is coupled to an active route processor in a redundant arrangement;

in response to determining, by an active BGP process of the active route processor, one or more transport layer important connections, associated with BGP sessions of the active route processor, transferring, from the active route processor to the standby route processor, one or more transport protocol connections that are associated with one or more active BGP sessions of the active route processor, starting from the one or more transport layer important connections, and instructing an active transport layer protocol process of the active route processor to stop accepting further data on the transferred transport protocol connections;

transferring, from the active route processor to the standby route processor, BGP session information representing the active BGP sessions;

progressively shutting down an active BGP process of the active route processor; and switching control of BGP data processing to the standby route processor;

wherein the route processors are placed in a stateful switchover mode of operation temporarily only during the transferring, shutting down, and switching.

* * * * *

UNITED STATES PATENT AND TRADEMARK OFFICE
CERTIFICATE OF CORRECTION

PATENT NO.       : 7,609,617 B2                                              Page 1 of 1
APPLICATION NO.  : 11/108053
DATED            : October 27, 2009
INVENTOR(S)      : Appanna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twelfth Day of October, 2010

David J. Kappos
*Director of the United States Patent and Trademark Office*